June 6, 1939. F. L. HUMESTON 2,161,051
ADJUSTABLE TELESCOPE MOUNT FOR FIREARMS
Filed March 6, 1937 2 Sheets-Sheet 1
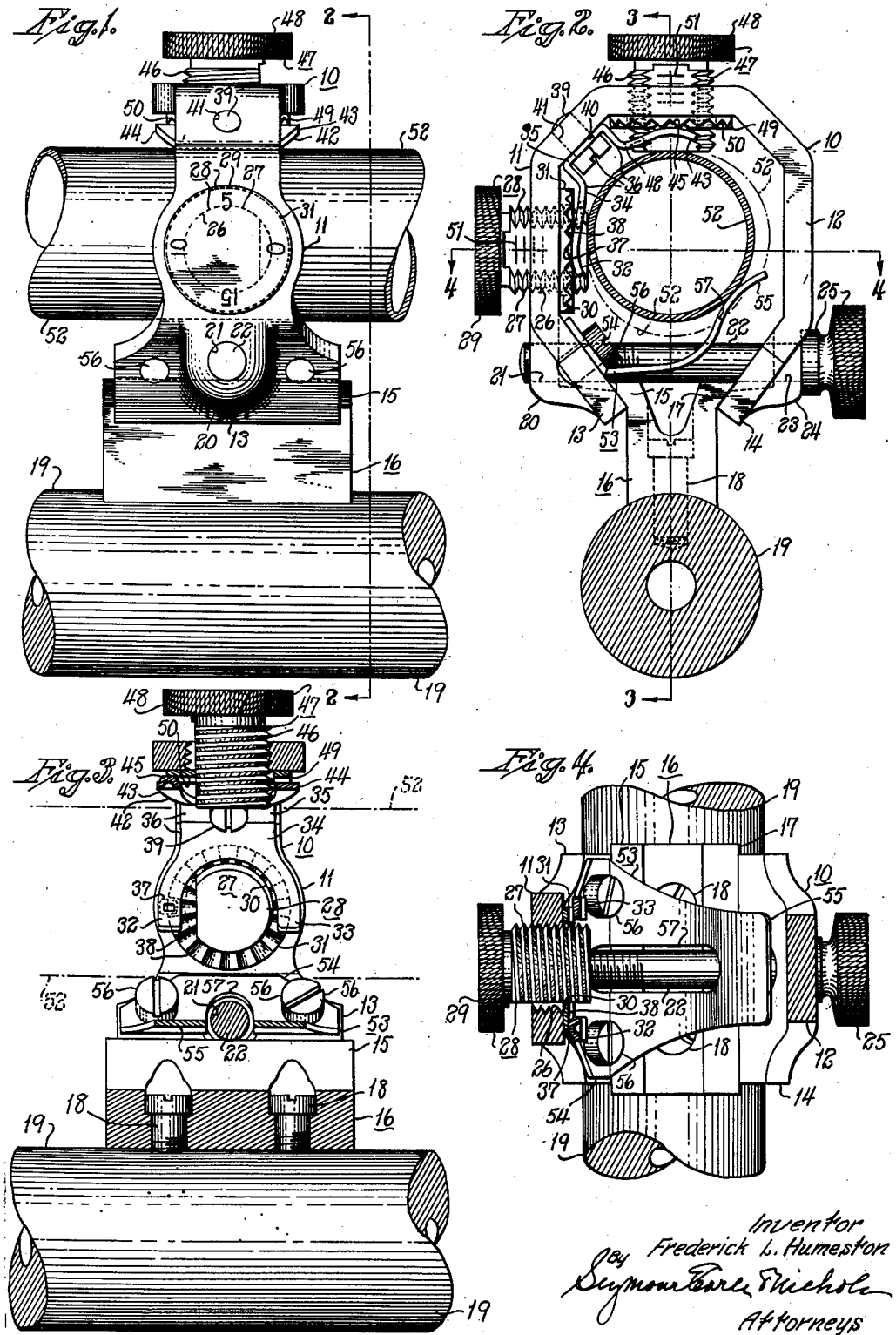
Inventor
Frederick L. Humeston
By Seymour Earle Nichols
Attorneys June 6, 1939.   F. L. HUMESTON   2,161,051
ADJUSTABLE TELESCOPE MOUNT FOR FIREARMS
Filed March 6, 1937   2 Sheets-Sheet 2
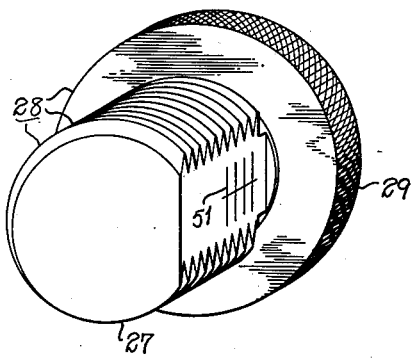
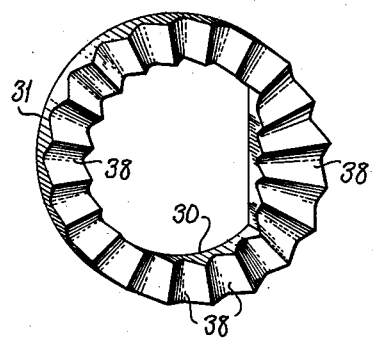
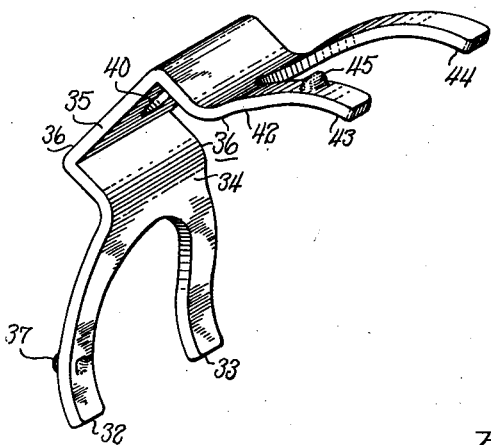
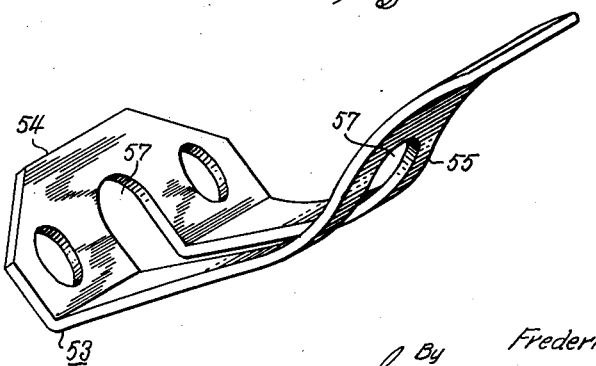
Inventor
Frederick L. Humeston
By Seymour Earle Nichols
Attorneys Patented June 6, 1939

2,161,051

UNITED STATES PATENT OFFICE 2,161,051

ADJUSTABLE TELESCOPE MOUNT FOR FIRE-ARMS

Frederick L. Humeston, New Haven, Conn., assignor, by mesne assignments, to Western Cartridge Company, a corporation of Delaware Application March 6, 1937, Serial No. 129,507

10 Claims. (Cl. 33—50)

This invention relates to telescope mounts for firearms and more particularly to telescope mounts by means of which a telescope may be attached to a firearm with capacity for adjustment with respect thereto.

One of the objects of the present invention is to provide a simple, reliable and low-cost mount for adjustably attaching telescopes to firearms.

Another object is to provide a superior adjustable telescope mount which may be readily and conveniently secured to and detached from a firearm structure.

A further object of the present invention is to provide a superior mount for attaching telescopes to firearms and by means of which a telescope may be readily adjustable to compensate for changes in range, winter conditions, etc., without permitting an objectionable degree of play or slackness of such telescope relative to the firearm structure.

With the above and other objects in view, as will appear to those skilled in the art from the present disclosure, this invention includes all features in the said disclosure which are novel over the prior art and which are not claimed by me in a separate application.

In the accompanying drawings, in which certain modes of carrying out the present invention are shown for illustrative purposes:

Fig. 1 is a view in side elevation of one form which an adjustable telescope mount may assume in accordance with the present invention and showing the said mount associated with a firearm barrel and a telescope tube;

Fig. 2 is a transverse sectional view thereof taken on the line 2—2 of Fig. 1;

Fig. 3 is a vertical central-longitudinal sectional view taken on the line 3—3 of Fig. 2, but omitting the telescoping tube for clarity of illustration;

Fig. 4 is a horizontal sectional view taken on the line 4—4 of Fig. 2, with the telescope tube omitted;

Fig. 5 is a perspective view of one of the adjusting-screws;

Fig. 6 is a perspective view of one of the detent-washers;

Fig. 7 is a perspective view of the double-armed detent-spring; and

Fig. 8 is a similar view of the tube-seating spring.

The particular adjustable telescope mount herein chosen for the purpose of illustrating the present invention includes a sheet- or plate-metal frame or body-member, generally designated by the reference character 10, and having a pair of oppositely-bowed arms 11 and 12 integrally united with each other at their upper ends, and also having their extreme lower ends bent inwardly to respectively provide inwardly-and-downwardly-sloping base- or support-clasping fingers 13 and 14. The inner face of the clasping finger 13 engages a similarly-sloping portion 15 of a block-like base or support 16 and in a similar manner, the inner face of the clasping finger 14 engages a portion 17 of the base or support 16, which latter portion has a slope corresponding to the slope of the said finger. The base or support 16, in the particular instance shown, is secured by a suitable number of screws such as 18—18 to a barrel 19 or other suitable portion of the firearm structure.

Adjacent its lower end, the base-clasping arm 11 is struck outwardly as at 20 and is there provided with a threaded bore 21 receiving the threaded end of a clamping-screw 22 which also extends freely through a perforation 23 in the outwardly-struck portion 24 of the base-clasping arm 12. The inner face of the head 25 of the clamping-screw 22 bears against the adjacent portion of the arm 12 and, together with its threaded opposite end, serves to firmly engage the base-clasping fingers 13 and 14 with the base or support 16.

The clamping-screw 22, just above referred to, is preferably so positioned as to rest upon the upper surface of the base or support 16 and thus serves to stabilize the body-member against bodily movement toward the barrel 19 and against tilting movement with respect to the block 16 and other stationary parts of the firearm structure. It will be noted, by reference to Fig. 2 in particular, that the inner surfaces of the clasping fingers 13 and 14, together with the transverse clamping-screw 22, outline, in effect, a dovetail groove receiving the dovetail rib-like upper portion of the base or support 16.

The central portion of the arm 11 of the body-member 10 is formed with a horizontally-extending threaded passage 26 receiving the threaded shank 27 of a horizontal adjusting-screw, generally designated by the reference character 28, and including a knurled head 29 by means of which the said adjusting-screw may be manipulated. The shank 27 of the adjusting-screw 28 is of D-shaped form in cross-section, as shown particularly well in Fig. 3, and enters into a D-shaped central aperture or passage 30 in a detent-washer 31 located against the inner face of the arm 11 and constituting, as will hereinafter appear, a detent-member which, by virtue of its D-shaped passage 30 and the D-shaped cross-sectional form of the shank 27, is coupled to the adjusting-screw 28 for rotation therewith, but which permits the said adjusting-screw to move axially with respect thereto.

The detent-washer 31 is retained in place against the inner face of the arm 11 by two resilient fingers 32 and 33 formed by notching or bifurcating the outer end of a spring-arm 34 offsetting from one side of the flat base-portion 35 of a double-armed detent-spring, generally designated by the reference character 36. The finger 32 of the arm 34 is struck up to provide a detent-projection 37 which is adapted to extend into any aligned one of an annular series of radial detent-notches 38 formed in the inner face of the detent-washer 31.

The double-armed detent-spring 36 is secured in place by extending a screw 39 through a central aperture 40 formed in the base-portion 35 of the said detent-spring and into an internally-threaded bore 41 in the adjacent portion of the arm 11 of the body-member 10.

Offsetting from the end of the base 35 of the detent-spring 36, at a point opposite the arm 34 before described, is a second spring-arm 42 corresponding in all essential respects to the said arm 34 and having two resilient fingers 43 and 44, the former of which, like the finger 32, is struck up to provide a detent-projection 45. The said resilient fingers 43 and 44 straddle the inner end of the shank 46 of a vertical adjusting-screw 47, corresponding to the horizontal adjusting-screw 28 before described, and like the same provided with a knurled head 48. The shank 46 of the adjusting-screw 47, like the shank 27 before referred to, is of D-shaped form in cross-section and is free for axial movement through a D-shaped opening formed in a detent-washer 49 corresponding to the washer 31 before described and turning with the adjusting-screw 47. The said detent-washer 49 is retained in place by the resilient arms 43 and 44 of the detent-spring 36 and is formed in its under-face with an annular series of detent-notches 50 with which the detent-projection 45 of the arm 43 is adapted to sequentially engage.

The flat portion of each of the D-shaped shanks 27 and 46 of the adjusting-screws 28 and 47 is preferably provided with graduations 51 by means of which the user may be guided in setting the said adjusting-screws. The outer face of either or both of the adjusting-screws 28 and 47 may also be provided, if desired and as shown in Fig. 1, with suitable indicia for gauging the degree of rotation of said adjusting-screws.

The body-member 10 is so shaped and proportioned as to provide ample space for the free extension therethrough of a telescope tube 52 (Figs. 1 and 2). To maintain the said telescope tube 52 in concurrent engagement with the inner ends of the adjusting-screws 28 and 47, despite various positions of adjustment to which the said adjusting-screws may be set, a tube-seating spring, generally designated by the reference character 53, is employed. The said tube-seating spring is bent up to form a base-portion 54 and a resilient pressure-arm 55, which latter engages the periphery of the telescope tube 52 at a point substantially diametrically opposite the screw 39 of the double-armed detent-spring 36, so as to concurrently exert both a lateral and vertical force component upon the said tube. The tube-seating spring, just referred to, is secured to the frame or body-member 10 by screws 56—56 passing through perforations in the base 54 and into threaded engagement with the lower portion of the clasping-arm 11.

For the purpose of clearing the clamping-screw 22 of the frame or body-member 10, the tube-seating spring 53 is provided with a central slot 57 which extends into both its base 54 and its resilient arm 55. By this means, a great degree of compactness is achieved and the clamping-screw 22 is free to be turned without interference from the tube-seating spring 53, and the latter is free to flex without interference from the said clamping-screw 22.

When it is desired to vertically adjust the telescope tube 52 for any reason such, for instance, as for a change of range, the vertical adjusting-screw 47 may be turned inwardly to depress the said tube against the tension of the tube-seating spring 53, or outwardly to permit the said tube to be lifted by the spring 53. The turning movement of the adjusting-screw 47 in either direction will be against the yielding resistance afforded by the engagement of the detent-projection 45 of the resilient arm 43 with the detent-notches 50 in the inner face of the detent-washer 49. As the said adjusting-screw is turned, the user will both feel and hear the click action provided by the engagement of the features 45 and 50, just referred to.

In a similar manner, the telescope tube 52 may be shifted laterally by the turning of the horizontal adjusting-screw 28 which when threaded inwardly will overcome the yielding force-component provided by the tube-seating spring 53 and which when turned outwardly will retire and permit the said spring to shift the said tube toward the arm 11. During the turning movement of the adjusting-screw 28, the detent-notches 38 in the washer 31 will ride under the detent-projection 37 of the resilient arm 32 and, as is the case with the vertical adjusting-screw 47, will provide a click effect for the guidance of the marksman and also serve to yieldingly hold the adjusting-screw in a given position of adjustment.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A telescope-mount for firearms, comprising: a body-unit provided with a threaded passage; a detent-member in rotational engagement with the said body-unit; an adjusting-screw extending through and having a threaded connection with the said threaded passage, the said adjusting-screw being movable axially past the said detent-member and having a non-rotational connection therewith for transmitting thereto only the rotational movement of the adjusting-screw; and a second detent-member connected to the body-unit independently of the adjusting-screw and in yieldable interlocking engagement with the first-mentioned detent-member under substantially-constant pressure during recurring intervals intervening between successive rotational displacements of the adjusting-screw.

2. A telescope-mount for firearms, comprising: a body-unit provided with a threaded passage;

a rotary detent-member in rotational contact with the said body-unit in a circular path extending around the said threaded passage at one end thereof; an adjusting-screw extending through and having a threaded connection with the said threaded passage, the said adjusting-screw being movable past the said detent-member and having a non-rotational connection therewith for transmitting thereto only the rotational movement of the adjusting-screw; and a second detent-member connected to the body-unit exteriorly to the said circular path and in yieldable interlocking engagement with the first-mentioned detent-member and retaining it in rotational contact with the body-unit in the said circular path.

3. A telescope-mount for firearms, comprising: a body-unit provided with a threaded passage; a rotary detent-member having one face thereof in rotational bearing engagement with the said body-unit around and at one end of the said threaded passage, and provided on its other face with an annular series of detent-notches; an adjusting-screw in slidable axial engagement with the said detent-member and having a non-rotational connection therewith for transmitting thereto only the rotational movements of the adjusting-screw; and a second detent-member connected to the body-unit and provided with a detent-projection engageable sequentially with the said detent-notches during recurring intervals intervening between successive rotational displacements of the adjusting-screw.

4. A telescope-mount for firearms, comprising: a body-unit provided with a threaded passage; a detent-member having one face thereof in rotational bearing-engagement with the body-unit around and at one end of the said passage; a second detent-member connected to the said body-unit and in yieldable engagement with the other face of the first-mentioned detent-member for retaining the first-mentioned detent-member in bearing-engagement with the said body-unit; and an adjusting-screw threaded in the threaded passage with which the body-unit is provided, the said adjusting-screw being movable axially past the first-mentioned detent-member and having a non-rotational connection therewith, whereby only the rotational movements of the adjustment-screw are transmitted to the first-mentioned detent-member.

5. A telescope-mount for firearms, comprising: a body-unit provided with two angularly-related threaded passages; a detent-member in rotational engagement with the said body-unit at one end of each of the said threaded passages; an adjusting-screw extending through and having a threaded connection with each of the said threaded passages, the said adjusting-screw being movable axially past the said detent-member and having a non-rotational connection therewith for transmitting only the rotational movements of the adjusting-screw to the said detent-member; and a second detent-member having an intermediate portion connected to the body-unit independently of both adjusting-screws and in yieldable engagement at opposite ends with the first-mentioned detent-members respectively under constant pressure during recurring intervals intervening between successive rotational displacements of the said adjustment-screws.

6. A telescope-mount for firearms, comprising: a body-unit having two complemental support-clasping arms, said body-unit being provided with two angularly-related threaded passages arranged substantially in a common plane transverse to the axis of a telescope to be mounted in the said body-unit; an adjusting-screw extending through and having a threaded connection with each of the said threaded passages respectively; a clamping-screw extending between the two complemental support-clasping arms of the body-unit substantially within the said common plane of the threaded passages in the body-unit; and an apertured spring-member mounted at one end upon one of the said support-clasping arms and with the said clamping-screw extending through the aperture therein, the said apertured spring-member having a free outer end presented over and above the other support-clasping arm substantially in the said common transverse plane of the threaded passages and arranged in joint opposition to the said adjusting-screws to maintain a telescope in seating engagement with the said screws.

7. A telescope-mount for firearms, comprising: a body-unit provided with two complemental support-clasping arms; a clamping-screw extending between the two complemental support-clasping arms of the body-unit, said body-unit being provided with angularly related threaded passages whose axes are located substantially in a common plane with the axis of the said clamping-screw and with the axes of the said threaded passages arranged substantially normal and parallel to the axis of the said clamping-screw respectively; and a spring-member mounted at one end on one of the said support-clasping arms and having a free end projecting outwardly therefrom to engage a telescope in counteracting relation to both of the said adjusting-screws, whereby the telescope is maintained in seating engagement therewith.

8. A telescope-mount for adjustably mounting telescopes on firearms, comprising: a body-unit of inverted U-shaped form in cross-section provided with means for supporting a telescope-tube, the free ends of the U being constructed substantially-uniform in thickness and arranged to form two opposed flexible support-clasping arms, the said support-clasping arms being flexible inwardly at their lower ends to conformably engage the upwardly-and-outwardly-sloping shoulders of a dovetailed mounting-lug on a firearm; the said support-clasping arms being provided also with coaxially-aligned threaded and rotational-bearing perforations for the opposite ends respectively of a clamping-and-stabilizing-screw; and a clamping-and-stabilizing-screw rotatably mounted at one end in the said rotational-bearing perforation and having its other end threaded into the said threaded perforation, the said clamping-and-stabilizing-screw being arranged to have bearing engagement with the top-surface of the said mounting-lug.

9. A telescope-mount for firearms, comprising: a body-unit of inverted U-shaped form in cross-section, said body-unit being constructed of sheet-metal to render it uniform in thickness and provided with means for supporting a telescope-tube, the free ends of the U being constructed and arranged to form two opposed flexible support-clasping arms flexible inwardly at their lower ends to conformably engage the upwardly-and-outwardly-sloping shoulders of a dovetailed mounting-lug on a firearm; the said support-clasping arms having oppositely- arranged struck-out wall-portions provided respectively with coaxially-aligned threaded and rotational-bearing perforations for the opposite ends of a transversely-arranged clamping-and-stabilizing-screw, and a clamping-and-stabilizing-screw rotatably mounted at one end in the said rotational-bearing perforation and threaded at its other end into the threaded perforation, the said clamping-and-stabilizing-screw being constructed and arranged to have bearing engagement with the mounting-lug at the top.

10. A telescope-mount for firearms, comprising: a body-unit provided with two angularly-related threaded-passages; an adjusting-screw extending through and having a threaded-connection with each of the said threaded-passages, said threaded-passages and adjusting-screws having their axes arranged in a common plane transverse to a telescope to be mounted in seating engagement with the inner ends of the said adjusting-screws; and a spring-arm symmetrically arranged with respect to the said common plane and mounted at one end on the said body-unit, the said spring-arm being constructed to be in bearing engagement at its free end with the telescope, in opposition to said adjusting-screws, and flexible about a remote axis disposed substantially in the tangential plane in which the said spring-arm is in bearing engagement with the telescope.

FREDERICK L. HUMESTON.